(12) United States Patent
Simko

(10) Patent No.: US 10,086,597 B2
(45) Date of Patent: Oct. 2, 2018

(54) LASER FILM DEBONDING METHOD

(71) Applicant: General Lasertronics Corporation, San Jose, CA (US)

(72) Inventor: Richard T. Simko, Los Altos Hills, CA (US)

(73) Assignee: General Lasertronics Corporation, San Jose, CA (US)

( * ) Notice: Subject to any disclaimer, the term of this patent is extended or adjusted under 35 U.S.C. 154(b) by 0 days.

(21) Appl. No.: 14/598,031

(22) Filed: Jan. 15, 2015

(65) Prior Publication Data

US 2015/0202858 A1     Jul. 23, 2015

Related U.S. Application Data

(60) Provisional application No. 61/929,887, filed on Jan. 21, 2014.

(51) Int. Cl.
| | |
|---|---|
| *H01L 21/84* | (2006.01) |
| *B32B 43/00* | (2006.01) |
| *B23K 26/38* | (2014.01) |
| *B29C 63/00* | (2006.01) |
| *B29L 31/08* | (2006.01) |

(52) U.S. Cl.
CPC ............ *B32B 43/006* (2013.01); *B23K 26/38* (2013.01); *B29C 63/0013* (2013.01); *B29L 2031/087* (2013.01); *Y10T 156/1158* (2015.01); *Y10T 156/1917* (2015.01)

(58) Field of Classification Search
CPC ......... Y01T 156/1158; Y01T 156/1917; B32B 43/006; B32K 26/38; B29C 63/0013; H01L 51/5253; H01L 51/76254; H01L 2221/6839; H01L 2221/68396; A61L 27/34

USPC .......... 156/712, 753; 438/157, 458, 459, 463
See application file for complete search history.

(56) References Cited

U.S. PATENT DOCUMENTS

| | | | |
|---|---|---|---|
| 3,624,553 | A | 11/1971 | Van-Tran |
| 3,626,141 | A | 12/1971 | Daly |
| 3,657,707 | A | 4/1972 | McFarland et al. |
| 3,771,880 | A | 11/1973 | Bennett |
| 3,843,865 | A | 10/1974 | Nath |

(Continued)

FOREIGN PATENT DOCUMENTS

| | | |
|---|---|---|
| FR | 2 661 371 | 4/1990 |
| FR | 2 689 423 | 4/1990 |

(Continued)

OTHER PUBLICATIONS

Tavernier et al., "Photoluminescence from laser assisted debonded epitaxial GaN and ZnO films", Applied Physics Letters 74(18), pp. 2678-2680 (May 3, 1999).*

(Continued)

*Primary Examiner* — Jami M Valentine
(74) *Attorney, Agent, or Firm* — Haverstock & Owens LLP

(57) ABSTRACT

A laser-based coating removal method debonds a film from a substrate rather than ablating the film. A laser light is transmitted through a transparent film to an underlying bonding layer for bonding the film to one or more additional films and/or a substrate. The laser light is absorbed at the bonding layer and the transparent film is released. In some embodiments, after the transparent film is released it is able to be physically removed.

34 Claims, 3 Drawing Sheets

(56) References Cited

U.S. PATENT DOCUMENTS

| | | |
|---|---|---|
| 3,941,973 A | 3/1976 | Luck, Jr. et al. |
| 4,114,018 A | 9/1978 | Von Alleman et al. |
| 4,136,779 A | 1/1979 | Bieringer |
| 4,148,057 A | 4/1979 | Jesse |
| 4,207,874 A | 6/1980 | Choy |
| 4,328,068 A | 5/1982 | Curtis |
| 4,398,790 A | 8/1983 | Righini et al. |
| 4,449,043 A | 5/1984 | Husbands |
| 4,521,070 A | 6/1985 | Scottini et al. |
| 4,543,477 A | 9/1985 | Doi et al. |
| 4,564,736 A | 1/1986 | Jones et al. |
| 4,566,937 A | 1/1986 | Pitts |
| 4,584,455 A | 4/1986 | Tomizawa |
| 4,588,885 A | 5/1986 | Lovoi et al. |
| 4,644,948 A | 2/1987 | Lang et al. |
| 4,654,532 A | 5/1987 | Hirshfield |
| 4,665,377 A | 5/1987 | Harpainter |
| 4,671,848 A | 6/1987 | Miller et al. |
| 4,676,586 A | 6/1987 | Jones et al. |
| 4,687,918 A | 8/1987 | Hughes et al. |
| 4,695,698 A | 9/1987 | Mayor et al. |
| 4,707,073 A | 11/1987 | Kocher |
| 4,729,621 A | 3/1988 | Edelman |
| 4,737,004 A | 4/1988 | Amitay et al. |
| 4,737,628 A | 4/1988 | Lovoi |
| 4,749,840 A | 6/1988 | Piwczyk |
| 4,756,756 A | 7/1988 | Woodroffe |
| 4,762,385 A | 8/1988 | Fuse |
| 4,799,755 A | 1/1989 | Jones |
| 4,807,954 A | 2/1989 | Oyamada et al. |
| 4,818,049 A | 4/1989 | Assenheim et al. |
| 4,818,062 A | 4/1989 | Schifres et al. |
| 4,821,943 A | 4/1989 | Gaudin et al. |
| 4,842,360 A | 6/1989 | Caro et al. |
| 4,844,574 A | 7/1989 | Chande |
| 4,844,947 A | 7/1989 | Kanser et al. |
| 4,859,075 A | 8/1989 | Sutter, Jr. et al. |
| 4,876,444 A | 10/1989 | Field |
| 4,880,959 A | 11/1989 | Baum et al. |
| 4,900,891 A | 2/1990 | Vega et al. |
| 4,920,994 A | 5/1990 | Nachbar |
| 4,928,695 A | 5/1990 | Goldman et al. |
| 4,931,616 A | 6/1990 | Usui et al. |
| 4,960,988 A | 10/1990 | Simms |
| 4,986,664 A | 1/1991 | Lovoi |
| 4,994,567 A | 2/1991 | Crisp et al. |
| 4,994,639 A * | 2/1991 | Dickinson ............... B64C 21/10 219/121.68 |
| 5,006,268 A | 4/1991 | Griffaton |
| 5,014,207 A | 5/1991 | Lawton |
| 5,040,479 A | 8/1991 | Thrash |
| 5,068,750 A | 11/1991 | Cook et al. |
| RE33,777 E | 12/1991 | Woodroffe |
| 5,081,350 A | 1/1992 | Iwasaki et al. |
| 5,107,445 A | 4/1992 | Jensen et al. |
| 5,113,802 A | 5/1992 | Le Blanc |
| 5,151,134 A | 9/1992 | Boquillion et al. |
| 5,194,723 A | 3/1993 | Cates et al. |
| 5,210,944 A | 5/1993 | Monson et al. |
| 5,216,808 A | 6/1993 | Martus et al. |
| 5,229,593 A | 7/1993 | Cato |
| 5,245,682 A | 9/1993 | Ortiz et al. |
| 5,281,798 A | 1/1994 | Hamm et al. |
| 5,291,570 A | 3/1994 | Filgas et al. |
| 5,293,023 A | 3/1994 | Haruta et al. |
| 5,328,517 A | 7/1994 | Cates et al. |
| 5,333,218 A | 7/1994 | Ortiz et al. |
| 5,355,063 A | 10/1994 | Boone et al. |
| 5,364,390 A | 11/1994 | Taboada et al. |
| 5,371,582 A | 12/1994 | Toba et al. |
| 5,373,140 A | 12/1994 | Nagy et al. |
| 5,386,112 A | 1/1995 | Dixon |
| 5,395,362 A | 3/1995 | Sacharoff et al. |
| 5,446,256 A | 8/1995 | Cartry |
| 5,451,765 A | 9/1995 | Gerber |
| 5,526,167 A | 6/1996 | Peng |
| 5,531,857 A | 7/1996 | Engelsberg et al. |
| 5,548,113 A | 8/1996 | Goldberg et al. |
| 5,558,666 A | 9/1996 | Dewey et al. |
| 5,571,335 A | 11/1996 | Lloyd |
| 5,581,346 A | 12/1996 | Sopori |
| 5,589,089 A | 12/1996 | Usegi |
| 5,592,879 A | 1/1997 | Waizmann |
| 5,593,808 A * | 1/1997 | Ellis ................... B41M 5/38257 430/201 |
| 5,610,753 A | 3/1997 | Kessler et al. |
| 5,613,509 A | 3/1997 | Kolb |
| 5,637,245 A | 6/1997 | Shelton |
| 5,643,476 A | 7/1997 | Garmine et al. |
| 5,656,186 A | 8/1997 | Mourou et al. |
| 5,662,762 A | 9/1997 | Ranalli |
| 5,720,894 A | 2/1998 | Neev |
| 5,767,479 A | 6/1998 | Kanaoka |
| 5,780,806 A | 7/1998 | Ferguson et al. |
| 5,784,162 A | 7/1998 | Cabib et al. |
| 5,790,046 A | 8/1998 | Blossfeld |
| 5,805,275 A | 9/1998 | Taylor |
| 5,845,646 A | 12/1998 | Lemelson |
| 5,864,114 A | 1/1999 | Fukuda |
| 5,889,253 A | 3/1999 | Kanaoka |
| 5,954,712 A | 9/1999 | Goodman |
| 5,986,234 A | 11/1999 | Matthews et al. |
| 6,040,549 A | 3/2000 | Kanaoka |
| 6,040,553 A | 3/2000 | Ross |
| 6,165,170 A | 12/2000 | Wynne et al. |
| 6,215,094 B1 | 4/2001 | Dausinger et al. |
| 6,285,002 B1 | 9/2001 | Ngoi et al. |
| 6,288,362 B1 | 9/2001 | Thomas et al. |
| 6,313,435 B1 | 11/2001 | Shoemaker et al. |
| 6,323,457 B1 | 11/2001 | Jung |
| 6,347,976 B1 | 2/2002 | Lawton et al. |
| 6,383,177 B1 | 5/2002 | Balle-Peterson et al. |
| 6,384,370 B1 | 5/2002 | Tsunemi et al. |
| 6,414,263 B1 | 7/2002 | Uchida |
| 6,437,285 B1 | 8/2002 | Thomas et al. |
| 6,494,960 B1 | 12/2002 | Macdonald et al. |
| 6,635,844 B2 | 10/2003 | Yu |
| 6,664,499 B1 | 12/2003 | Brink et al. |
| 6,693,255 B2 | 2/2004 | Freiwald |
| 6,864,478 B2 | 3/2005 | Schroder |
| 6,924,457 B2 | 8/2005 | Koyoma et al. |
| 6,927,917 B2 | 8/2005 | Kiruma |
| 7,009,141 B1 | 3/2006 | Wool et al. |
| 7,170,030 B2 | 1/2007 | Haight |
| 7,265,033 B2 | 9/2007 | Shigematsu et al. |
| 7,381,383 B1 | 6/2008 | Yokoyama |
| 7,397,014 B2 | 7/2008 | Hart et al. |
| 7,407,591 B2 | 8/2008 | De Battisti et al. |
| 7,408,130 B2 | 8/2008 | Sonoda et al. |
| 7,452,476 B2 | 11/2008 | Bayer et al. |
| 7,525,065 B2 * | 4/2009 | Engler ................. B08B 7/0042 219/121.69 |
| 7,535,565 B1 | 5/2009 | Viertl et al. |
| 7,632,420 B2 | 12/2009 | Thomas |
| 7,633,033 B2 | 12/2009 | Thomas et al. |
| 7,800,014 B2 | 9/2010 | Thomas et al. |
| 7,833,463 B1 * | 11/2010 | Munson, Jr. ............ A61L 27/34 156/712 |
| 7,867,404 B2 | 1/2011 | Deutsch |
| 8,030,594 B2 | 10/2011 | Thomas et al. |
| 8,182,609 B1 | 5/2012 | Le Claire et al. |
| 8,246,172 B2 | 8/2012 | Amano |
| 8,348,655 B2 | 1/2013 | Kazusako et al. |
| 8,604,380 B2 | 12/2013 | Howerton et al. |
| 8,687,189 B2 | 4/2014 | Agrawal et al. |
| 8,980,639 B2 | 3/2015 | Clark et al. |
| 2002/0134770 A1 | 9/2002 | Freiwald et al. |
| 2002/0153361 A1 | 10/2002 | Sakamoto |
| 2003/0040164 A1 * | 2/2003 | Inoue ................. H01L 21/2007 438/438 |
| 2003/0062349 A1 | 4/2003 | Suh et al. |
| 2003/0083646 A1 * | 5/2003 | Sirhan ................. A61F 2/91 604/891.1 |
| 2003/0169167 A1 | 9/2003 | Fey et al. |

(56) References Cited

U.S. PATENT DOCUMENTS

| | | |
|---|---|---|
| 2004/0045497 A1 | 3/2004 | Kriews et al. |
| 2004/0057047 A1 | 3/2004 | Knebel |
| 2004/0199151 A1 | 10/2004 | Neuberger |
| 2004/0219286 A1 | 11/2004 | Flanagan |
| 2005/0072612 A1 | 4/2005 | Maggio |
| 2005/0150878 A1 | 7/2005 | Thomas et al. |
| 2005/0211680 A1 | 9/2005 | Li |
| 2005/0224474 A1 | 10/2005 | Kilburn |
| 2005/0233547 A1* | 10/2005 | Noda .................. B32B 43/006 438/459 |
| 2006/0000488 A1* | 1/2006 | Claar .................... B44D 3/16 134/1.1 |
| 2006/0151433 A1 | 7/2006 | Chang et al. |
| 2006/0186098 A1 | 8/2006 | Caristan |
| 2006/0273896 A1 | 12/2006 | Kates |
| 2007/0000885 A1 | 1/2007 | Thomas et al. |
| 2007/0051708 A1 | 3/2007 | Talwar et al. |
| 2007/0129474 A1* | 6/2007 | Salamone .............. A61L 15/26 524/261 |
| 2007/0224768 A1 | 9/2007 | Chaplick et al. |
| 2008/0006615 A1 | 1/2008 | Rosario et al. |
| 2008/0134939 A1* | 6/2008 | Arpac ................... B82Y 30/00 106/287.23 |
| 2009/0007933 A1 | 1/2009 | Thomas et al. |
| 2009/0242527 A1 | 10/2009 | Anger |
| 2010/0033817 A1 | 2/2010 | Ono |
| 2010/0093112 A1 | 4/2010 | Takagi et al. |
| 2010/0134628 A1 | 6/2010 | Pfitzner et al. |
| 2010/0176101 A1 | 7/2010 | Costin et al. |
| 2010/0243625 A1 | 9/2010 | Osako |
| 2010/0272961 A1 | 10/2010 | Costin, Jr. |
| 2011/0024400 A1 | 2/2011 | Rumsby |
| 2011/0088720 A1 | 4/2011 | Varanasi et al. |
| 2011/0168679 A1 | 7/2011 | Qi et al. |
| 2011/0186553 A1 | 8/2011 | Chung |
| 2011/0206071 A1 | 8/2011 | Karavitis |
| 2011/0240617 A1* | 10/2011 | Xu ....................... B23K 26/00 219/121.72 |
| 2012/0086934 A1* | 4/2012 | Digonnet ........... G01D 5/35316 356/32 |
| 2013/0036380 A1 | 2/2013 | Symons |
| 2013/0136744 A1 | 5/2013 | Bouche et al. |
| 2013/0199732 A1 | 8/2013 | Niwa et al. |

FOREIGN PATENT DOCUMENTS

| | | |
|---|---|---|
| GB | 2 246 099 A | 1/1992 |
| GB | 2 402 230 B | 12/2004 |
| JP | 01203090 A | 8/1989 |
| JP | 02263854 A | 10/1990 |
| JP | 05082276 A | 4/1993 |
| JP | 05138377 A | 6/1993 |
| JP | 10309516 A | 11/1998 |
| JP | 2000103607 A | 4/2000 |
| JP | 2001300755 A | 1/2001 |
| JP | 200168829 | 3/2001 |
| JP | 361161781 A | 6/2003 |
| WO | 8301400 | 4/1983 |
| WO | 2004039531 A2 | 10/2004 |

OTHER PUBLICATIONS

Horie et al., "Interface structure modified by plasma-surface interaction and its effect on ablative hole opening process in a bilayer system of TeSeF film and a fluorocarbon subbing layer", Journal of Applied Physics 77, 162-166 (Jan. 1995), American Institute of Physics.*

"Photonic Cleaning Process Moves to Heavy Industry," Mar. 1997, p. 22, Photonics Spectra.

Freiwald et al., "Laser Ablation of Contaminants fromConcrete and Metals Surfaces," Dec. 1994, pp. 1-53, F2 Associats, Incorporated.

Inta, "Radiant Energy Based Cleaning and Coating Removal Technology Comparison," Aug. 8, 1994, pgs.

Barone, Philip A. "Automated Laser Paint Stripping(ALPS)," Jun. 1, 1992, pp. AD92-206-1 through AD92-206-17, Society of Manufacturing Engineers.

"The Company the Technology," Apr. 1997, General Lasertronics Corporation.

"Lasertronics Corporate Overview," Apr. 1997, Lasertronics Engineering Excellence.

"Lasertronics Aircraft Paint Removal," Apr. 1997, Lasertronics Engineering Excellence.

"Lasertronics Radiation/Medical Decontamination," Apr. 1997, Lasertronics Engineering Excellence.

"Lasertronics Graffiti Abatement," Apr. 1997, Lasertronics Engineering Excellence.

"Lasertroniics Lead-Based Paint Removal," Apr. 1997, Lasertronics Engineering Excellence.

Driscoll et al., "Handbook of Optics," Dec. 1978, pp. 13-6 through 13-10, McGraw-Hill Book Company.

Liu et al., "Paint Removal Using Lasers," Jul. 20, 1995, pp. 4409-4414, Applied Optics, vol. 34, No. 21.

Lovoi, Paul, "Laser Paint Stripping Offers Control and Flexibility," Nov. 1994,pp. 75-80, Laser Focus World.

Bonkowski et al., "CW Laser Paint Stripping," Aug. 1991, pp. 1-20, The Laser Institute and National Science and Engineering Research Council.

Lovoi, Paul,"Laser/Robot Paint Stripping, Laser Ablation CoatingRemoval," Apr. 1988, International Technical Associates.

Kononenko et al., "Ablation of CVD diamond with nanosecond laser pulses of UV-IR range", Apr. 1998, Elsevier, Diamond and Related Materials , vol. 7, pp. 1623-1627.

Montelica-Heino et al., "Macro and Microchemistry of trace metals in vitrified domestic wastes by laser ablation ICP-MS and scanning electron microprobe X-Ray energy dispersive spectroscopy", Aug. 1998, Elsevier, Talanta, pp. 407-422.

Hagans et al., "Chromate Conversion Coatings", Dec. 1994, ASM Handbook, vol. 5, Surface Engineering , pp. 405-411.

Obertson, "Diamond-like amorphous carbon", Dec. 2002, Elsevier, Materials Science and Engeneering R, vol. 7, pp. 129-281.

* cited by examiner

LASER FILM DEBONDING METHOD

RELATED APPLICATIONS

This Patent Application claims priority under U.S.C. 119(e) of the U.S. Provisional Patent Application No. 61/929,887, filed on Jan. 21, 2014, and entitled "LASER FILM DEBONDING METHOD," which is hereby incorporated by reference in its entirety.

FIELD OF THE INVENTION

The present invention is generally directed to systems and methods of laser removal of coatings. More specifically, the present invention is directed to a method of removing a protective film without damaging the underlying substrate.

BACKGROUND OF THE INVENTION

In the maintenance and possibly manufacturing or rework of aircraft propellers it is required that certain damaged protective films be removed and fresh films be applied to refurbish the propellers and return them to use. Such rework or repair may also be required for large turbine blades of wind powered electric generators. Damage to propellers or blades often occurs from normal use such as wear and tear from high speed impact of rain and ice particles or bird strikes to sand and gravel impact. Some aircraft runways may consist of only a "dirt"strip or a sandy beach. As such, debris can become airborn and flow into the propeller or blade wash. Propeller damage may also result from military conflict or simple maintenance accidents.

A conventional example of an aircraft propeller and coating is that of a painted metal propeller. However, more recently developed high efficiency and light weight propellers are constructed of fiberglass or carbon fiber composite substrates rather than aluminum alloys. These propellers may have a protective coating other than paint. A possible coating may be polyurethane. These coatings may range in thickness from a few thousandths of an inch to many tens of thousands. Polyurethane is a well known material also used to protect hardwood floors in homes.

To maintain the propellers, the damaged protective film first needs to be removed. This removal presents a formidable practical problem. Conventional methods such as sanding, media blasting, scrapping or chiseling are both time consuming and may cause further damage to the underlying composite substrate therefore requiring further time consuming and expensive substrate repair after the old protective film is removed. FIG. 1 illustrates an approach to remove a protective film such as paint on metal such as a painted propeller. In this approach, the film is slowly ablated by decomposing the film in multiple passes of a scanned laser beam of appropriate optical characteristics. Typically, this approach also requires much power.

SUMMARY OF THE INVENTION

A laser-based coating removal method debonds a film from a substrate rather than ablating the film. A laser light is transmitted through a transparent film to an underlying bonding layer for bonding the film to one or more additional films and/or a substrate. The laser light is absorbed at the bonding layer and the transparent film is released. In some embodiments, after the transparent film is released it is able to be physically removed.

In one aspect, a method of removing a protective film from a substrate comprises transmitting a laser light through a transparent film to an underlying bonding layer and absorbing the laser light at the bonding at the layer, wherein as the laser light is absorbed at the bonding layer, the transparent film is released. After the transparent film is released, the released film is able to be physically lifted away from the substrate. Particularly, during the method the film remains substantially intact and not melted or deformed or decomposed. Additionally, there is no substantial thermal nor structural damage to the underlying substrate. In some embodiments, the film is polyurethane. In some embodiments, the substrate comprises one of a fiberglass composite, a carbon fiber and epoxy composite, and a composite foam material. The laser beam may be scanned in order to substantially clean up or prepare the substrate surface for strong adhesion of a new layer of protective coating. In some embodiments, the protective film ranges from 0.001 inches to 0.300 inches thickness. In some embodiments, the laser wavelength is in the near infrared. In further embodiments, the laser wavelength is 1064 nanometers. In some embodiments, the laser scanning method is completed by a machine such as an XY table. In some of these embodiments, the XY translator table is computer controlled. In some embodiments, the scanning method is manual such that a laser work head is moved by hand by over the work piece. Alternatively, the work head may be scanned over the work piece by a robot. In some embodiments, the substrate comprises a propeller blade, such as, from an aircraft or a hovercraft or a rotor blade such from a helicopter or from a wind turbine blade. In some embodiments, the laser is a pulsed Nd:YAG laser. In some embodiments, the laser average power is at least 10 watts. In further embodiments, the laser repetition rate is at least 100 per second. In some embodiments, a laser spot size ranges from 0.1 mm to 10 mm diameter.

In a further aspect, a method of removing a protective film from a substrate comprises transmitting a laser light through a first film layer to a second film layer above the substrate and absorbing the laser light at an adhering interface between the first film layer and the second film layer, wherein as the laser light is absorbed at the interface, the first film and the second film are debonded. In some embodiments, the first film layer and the second film layer comprise polyurethane. The first film layer remains intact as the first film and the second film are debonded. In some embodiments, the protective film layers range from 0.001 inches to 0.300 inches thickness. In some embodiments, the laser wavelength is in the near infrared. In further embodiments, the laser wavelength is 1064 nanometers.

In another aspect, a method of removing one or more protective films from a substrate comprises transmitting a laser light through one or more than one transparent films and absorbing the laser light at an adhering interface between a last film above the substrate and a second to last film, wherein as the laser light is absorbed at the interface, the last film and the second to the last film are debonded. In some embodiments, the last film above the substrate and the second to last film comprise polyurethane. The second to last film remains intact as the last film and the second to the last film are debonded. In some embodiments, the protective film layers range from 0.001 inches to 0.300 inches thickness. In some embodiments, the laser wavelength is in the near infrared. In further embodiments, the laser wavelength is 1064 nanometers.

In still a further aspect, a laser-based coating removal system to remove a coating from a surface comprises a laser source configured to provide a laser pulse, a laser scanning head coupled to the laser source and configured to direct the laser pulse onto a position on the surface, wherein the laser pulse is configured with a wavelength such that the laser pulse passes through one or more transparent films and to an underlying bonding layer, and wherein as the laser light is absorbed at the bonding layer, the one or more transparent films are released. In some embodiments, the laser scanning head is machine controlled. Alternatively, the laser scanning head is manually controlled such that the work head is moved by hand over the work piece. In some embodiments, the coating ranges from 0.001 inches to 0.300 inches thickness. In some embodiments, the laser wavelength is in the near infrared. In some embodiments, the laser wavelength is 1064 nanometers. In some embodiments, the laser comprises a pulsed Nd:YAG laser. In further embodiments, the laser average power is at least 10 watts. In some embodiments, the laser repetition rate is at least 100 per second. In further embodiments, a laser spot size ranges from 0.1 mm to 10 mm diameter.

DETAILED DESCRIPTION OF THE EMBODIMENTS

Embodiments of the invention are directed to a system and method for debonding a film from a substrate rather than ablating the film. A laser light is transmitted through a transparent film to an underlying bonding layer for bonding the film to one or more additional films and/or a substrate. The laser light is absorbed at the bonding layer and the transparent film is released. In some embodiments, after the transparent film is released it is able to be physically removed.

Reference will now be made in detail to implementations of a laser-based coating removal system and method as illustrated in the accompanying drawings. The same reference indicators will be used through the drawings and the following detailed description to refer to the same or like parts. In the interest of clarity, not all of the routine features of the implementations described herein are shown and described. It will also be appreciated that in the development of any such actual implementation, numerous implementation-specific decisions be made to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention takes a unique and efficient approach to film removal by de-bonding the film rather than laboriously ablating it. The removal of paint by laser method is a typical example of ablating. In ablation, the film is decomposed into simpler components such as carbon dioxide and water vapor. Alternatively the film can be rather exploded or pyrolized on a microscopic level—laser spot by laser spot—from the surface in thin layers as a laser makes pass after pass to, in effect, shave away the film (paint). This process while quite useful is time and energy consuming. Indeed for thicker films greater than a few thousandths of an inch "mils" the process can be time consuming taking perhaps minutes or hours per square foot of area while requiring a relatively high powered laser, say, hundreds of watts of average power.

In the case of removing relatively thick films from large propellers which may have on the order of 10 sq. ft of area per blade and which may range from a few mils to 100 mils thickness, if an ablation method were used, the process could take many hours or days to complete.

Figure 1:
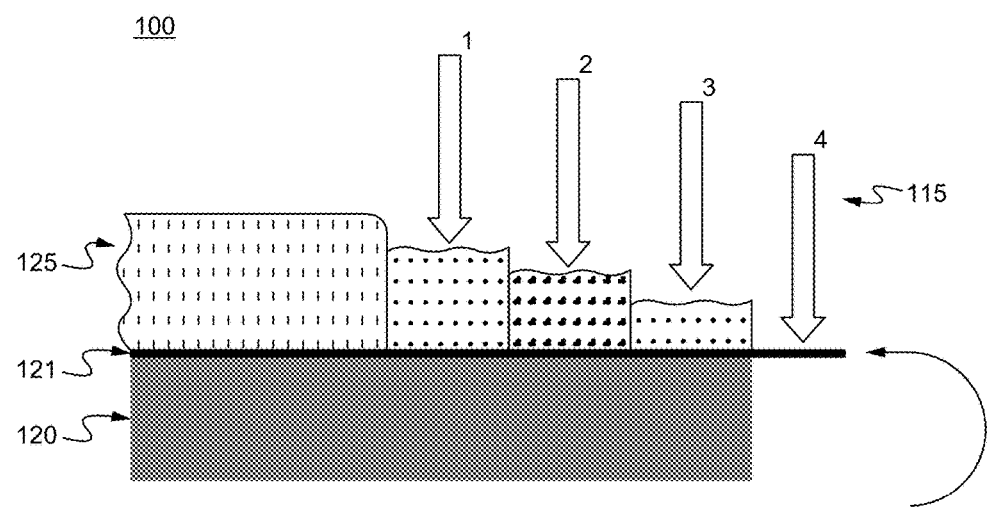
FIG. 1 illustrates a prior system for removing a protective film from a surface in accordance with some embodiments.

As shown in FIG. 1, a prior art system utilizes a series of laser light pulses 115 in order to remove a coating 125 from an underlying primer 121 and substrate 120. This ablation approach however, requires multiple passes, excess energy and time.

Figure 2:
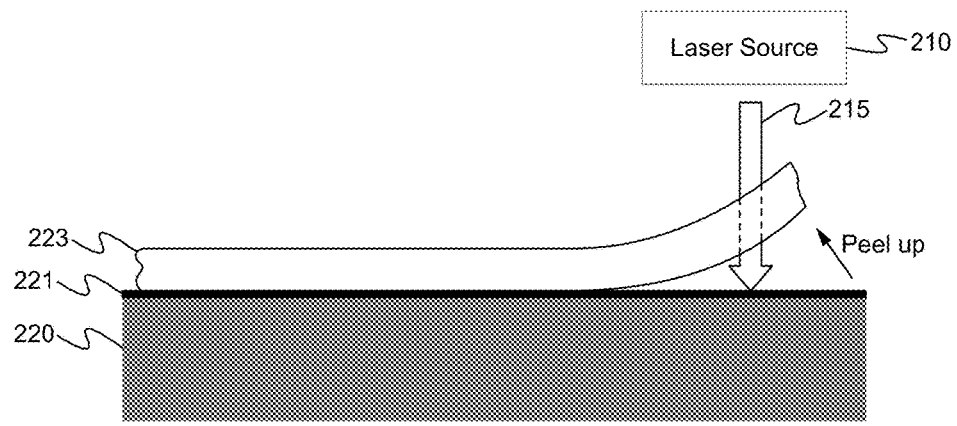
FIGS. 2 and 3 illustrate a system for removing a protective film from a surface in accordance with some embodiments.

FIG. 2 illustrates an example of a system for debonding a film from a substrate rather than slowly ablating it. As shown in FIG. 2, the system comprises a laser source 210 that directs a laser pulse 215 to a location in order to remove a film 223 from a substrate 220. The film 223 is substantially translucent which enables the laser light pulse 215 to pass through the film 223 and be absorbed by an underlying primer and/or bonding layer 221 on a surface of the substrate 220. In some embodiments, the protective film 223 comprises a coating material such as polyurethane and the substrate comprises a metal and/or a composite such as carbon fiber or fiberglass. The laser light 215 is absorbed at the underlying primer and/or bonding layer 221 which causes debonding between the film 223 and the substrate 220.

The film 223 to be de-bonded from the substrate 220 is substantially transparent to the laser light 215 such that the film transmits the photonic energy to the underlying bonding layer 221. The underlying bonding layer 221 is then be substantially or at least sufficiently absorptive of the laser energy 215 at the laser wavelength. Consequently, when the laser energy 215 is absorbed by the bonding layer 221, the bonding molecules then substantially debond or locally decompose thereby releasing the overlying film 223. Once de-bonded, the overlying film 223 for the areas exposed to the laser light 215 can then be physically lifted away free of any connection to the substrate 220. In some embodiments, only one pass of the laser light 215 is required. In some embodiments, the laser source 210 comprises a computer controlled XY translator table. However, the laser source 210 is able to comprise any appropriately desired computer controlled or manually operated laser scanning head.

The bonding layer 221 may be a primer or other adhesive layer between the substrate 220 and the overlying film 223. In some embodiments, it is also a thin upper layer of the substrate itself as long as the bonding layer 221 substantially absorbs the laser energy 215. The absorbed energy breaks the bond locally in a very thin zone while leaving the overlying film 223 intact and not damaging the substrate 220.

Figure 3:
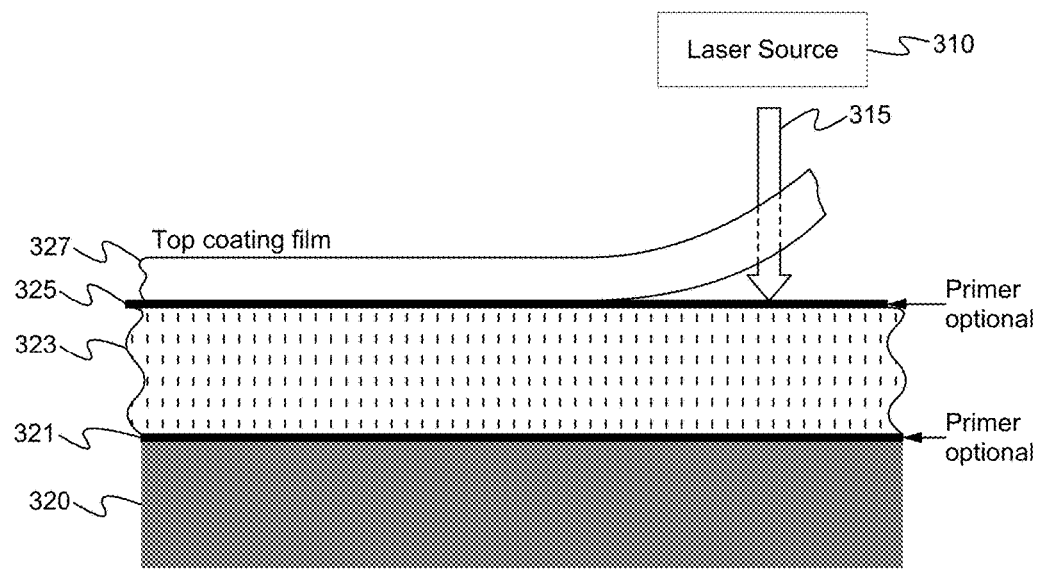

In some embodiments, the laser source 215 is able to transmit a laser light through a first film layer to a second film film layer above the substrate in order to debond the first film layer from the second film. As shown in FIG. 3, a laser source 310 directs a laser pulse 315 to a location in order to remove the first film 327 from the second film 323 and the substrate 320.

The first film 327 and/or upper film is substantially translucent which enables the laser light pulse 315 to pass through the first film 327 and be absorbed by an underlying primer and/or bonding layer 325 which provides an interface between the first film layer 327 and the second film layer 327. The first film layer 327 and the second film layer 323 are able to be transparent to the laser light 315 as long as the underlying primer and/or bonding layer 325 is able to absorb the laser light 315 energy. For example, as described above, in some embodiments, the first film 327 and the second film 323 comprise a transparent coating layer such as polyurethane. The laser light 315 is absorbed at the underlying primer and/or bonding layer 325 which causes debonding between the first film 327 and the second film 323. The underlying or second film layer 323 does not have to be the substrate 320. When the energy is absorbed, the bond breaks between the first film 327 and the second film 323, thus interlayer debonding is possible above the substrate 320.

Figure 4:
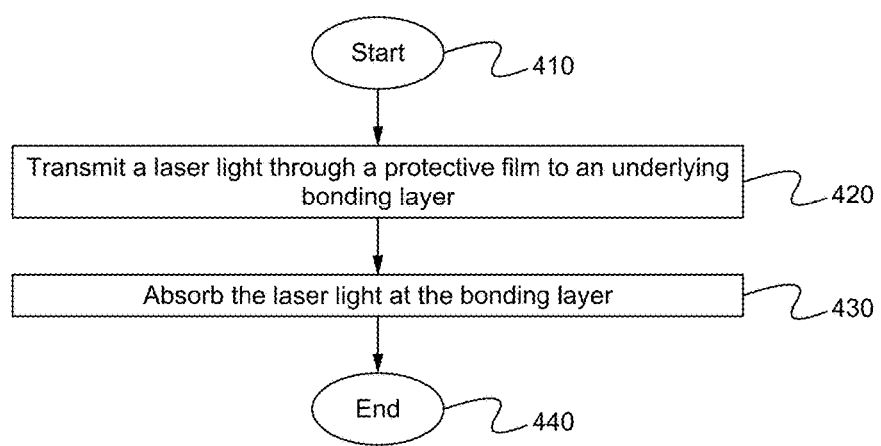
FIGS. 4-6 illustrate a method of removing a protective film from a surface in accordance with some embodiments.

FIG. 4 illustrates a method of removing a protective film from a substrate in accordance with the above embodiments. The method begins in the step 410. In the step 420, a laser light is transmitted through a protective film to an underlying bonding layer. In some embodiments, the protective film is a transparent film such as polyurethane. In the step 430, the laser light is absorbed at the bonding layer between the protective film and an underlying substrate. When the laser energy is absorbed by the bonding layer the bonding molecules then substantially debond or locally decompose thereby releasing the overlying film. Once de-bonded, the overlying film for the areas exposed to the laser light can then be physically lifted away free of any connection to the substrate. The method ends in the step 440.

Figure 5:
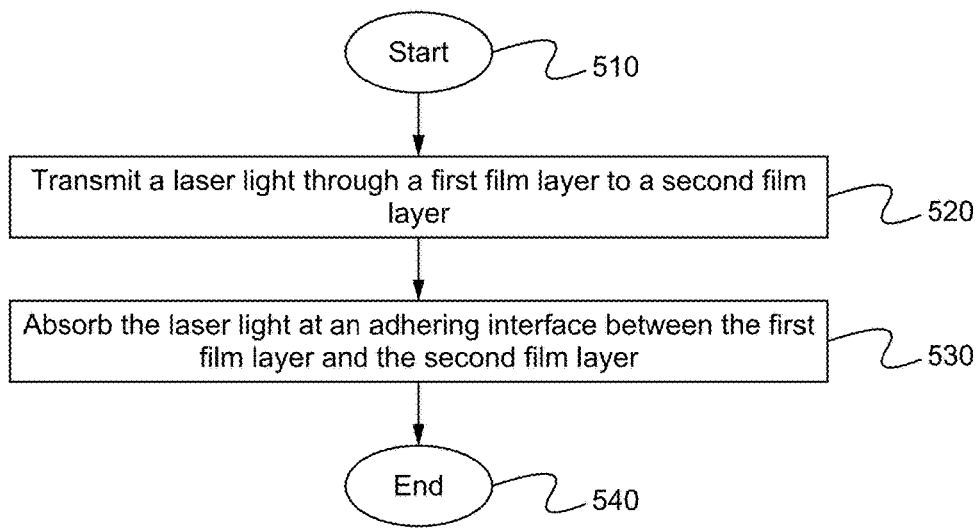

As described above, the laser source is able to transmit a laser light through a first film layer to a second film layer above the substrate in order to debond the first film layer from the second film. FIG. 5 illustrates a method of removing a first and/or top coating layer from an underlying second and/or bottom coating layer. The method begins in the step 510. In the step 520, a laser light is transmitted through a first film layer and to a second film layer where the light is absorbed at an adhering interface between the first film layer and the second film layer in the step 530. The first film layer and the second film layer are able to be transparent to the laser light as long as the underlying primer and/or bonding layer is able to absorb the laser light energy. When the laser energy is absorbed by the adhering interface the adhering molecules then substantially debond or locally decompose thereby releasing the overlying film. Once de-bonded, the overlying first film for the areas exposed to the laser light can then be physically lifted away free of any connection to second film and the substrate. The method ends in the step 540.

Figure 6:
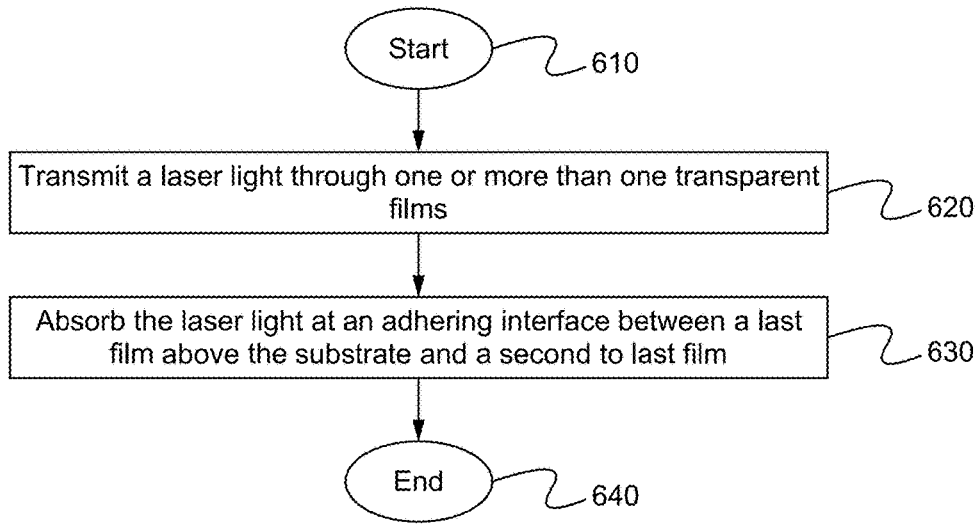

Particularly, the laser light source is able to be used to in order to remove one or more than one transparent films from a substrate. For example, FIG. 6 illustrates a method of removing one or more than one protective layer from a substrate. The method begins in the step 610. In the step 620, a laser light is transmitted through one or more than one transparent films coupled to a substrate. In the step 630, the laser light is absorbed at an adhering and/or bonding interface between a last film above the substrate and a second to last film. As described above, when the laser energy is absorbed by the bonding layer the bonding molecules then substantially debond or locally decompose thereby releasing the overlying film. Once de-bonded, the overlying film for the areas exposed to the laser light can then be physically lifted away free of any connection to the substrate. The method ends in the step 640.

The key to this laser method is that the film to be de-bonded from a substrate is substantially transparent to the laser light such that the film transmits the photonic energy to the underlying bonding layer. The underlying bonding layer must then be substantially or at least sufficiently absorptive of the laser energy at the laser wavelength. When such laser energy is absorbed by the bonding layer the bonding molecules then substantially debond or locally decompose thereby releasing the overlying film. In such a method the overlying film for areas exposed to the laser light can now be physically lifted away free of any connection to the substrate.

Adjacent areas not exposed to the laser retain their strong bond. At such a boundary line if it is desired to remove the film at the laser treated areas, the de-bonded film can simply be cut away with a sharp tool (knife, scissor, razor blade) such as in the case of a local repair depot.

In some embodiments, laser light in the near infrared range, such as, approximately 1 micron, or more specifically, 1064 nanometers wavelength will substantially transmit through such a coating material as polyurethane. In some embodiments, a Nd:YAG laser will generate this light wavelength at high enough power for practical and economic application. Good transmission may occur even for thicknesses approaching 100 mils. The laser light is further able to be absorbed by underlying layers such as the top epoxy layer in a fiberglass or carbon fiber composite substrate. The absorption produces very localized and instantaneous heating at the poly and epoxy interface such as to break the bond between the two layers. At the same time the laser energy delivered (fluence) is not so large as to heat the poly layer to melting or flowing and neither overheats nor damages the composite fiberglass or carbon fiber substrate epoxy or composite matrix. By way of example, such laser treated areas barely reach human body temperature in a practical application. The laser energy is able to de-bond the layers with no flame hazard and without smoke or the observation of other vapors.

Scanning Methods

In some embodiments, the laser beam may be scanned over the work piece by a source machine where an "XY" transport table moves a work piece under a laser work head as is generally known in the art. Alternatively, the work piece may also be scanned manually by a hand held work head. Particularly, the work piece is able to be scanned using any appropriately desired method as known in the art.

Interface Clean Up

In some embodiments, the laser system may further be used to clean up a very thin layer of decomposed primer or adhesive layer which might result in the formation of a black "soot" that is created by the local laser heating and adhesive decomposition at the interface. After the film (polyurethane) is lifted away from the substrate (essentially in one piece) a very thin black sooty layer may remain on the substrate. The adhesive may be an epoxy compound.

In case it is desired to clean up the substrate prior to applying a new fresh coat of protective film (polyurethane), traditional manual methods such as fine sand papering and solvent wipe can be employed. However, the laser may also be used to clean the interface of soot while not creating sanding debris nor chemical waste. It has been found that the laser with substantially the same power and beam scanning setting as used in the de-bonding can clean the surface perhaps better than fine grit sandpaper. Notably a thin layer of bonding compound, which may be epoxy, remains and thereby the composite substrate is still covered.

In operation, the system and method for debonding a film from a substrate is able to quickly remove such films in minutes on a large propeller blade, consumes relatively little laser energy and does not damage the substrate. A composite substrate propeller blade of approximate 6 foot length with a protective polyurethane film a few mils to 100 mils thick can have its polyurethane coating de-bonded by laser in about 5 minutes while requiring only 300 watts average laser power at the surface. The method can work with a pulsed laser as low powered as 40 watts average power, but the debonding rate will be proportionally slower. Of course, the instantaneous laser power for a pulsed laser can be many tens of kilowatts per spot. The pulse duration for each spot is relatively short, such as 100 nanoseconds by example. Pulse repetition rate may be 10,000 per second by way of example.

The present invention takes a unique and efficient approach to film removal by de-bonding the film rather than laboriously ablating it. The method transmits laser light and photonic energy to an underlying bonding layer coupling a protective film to one or more additional layers and/or a substrate. When the laser energy is absorbed by the bonding layer the bonding molecules then substantially debond or locally decompose thereby releasing the overlying film. In such a method the overlying film for areas exposed to the laser light can now be physically lifted away free of any connection to the substrate. The film is quickly removed without damaging the substrates and while consuming relatively little laser energy. Accordingly, the laser film debonding method as described herein has many advantages.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of removing a transparent protective surface film from a substrate comprising a first material, the method comprising:
   a. transmitting a laser light at a wavelength to transmit through the transparent protective surface film and to be absorbed at an underlying and separately applied bonding layer, wherein the underlying bonding layer adheres the protective surface film to the substrate, and wherein the protective surface film comprises a second material different from the first material;
   b. absorbing the laser light at the bonding at the layer, wherein the bonding layer comprises a third material different from the first material and the second material, wherein as the laser light is absorbed at the bonding layer, the transparent protective surface film is released; and
   c. discarding the transparent protective surface film.

2. The method of claim 1, wherein the film comprises polyurethane.

3. The method of claim 1, wherein the substrate comprises one of a fiberglass composite, a carbon fiber and epoxy composite, and a composite foam material.

4. The method of claim 1, wherein the transparent film ranges from 0.001 inches to 0.300 inches thickness.

5. The method of claim 1, wherein the laser wavelength is in the near infrared.

6. The method of claim 1, wherein the laser wavelength is 1064 nanometers.

7. The method of claim 1, wherein the method is machine controlled.

8. The method of claim 1, wherein the method is manual such that a laser work head is moved by hand by over a work piece.

9. The method of claim 1, wherein the laser comprises a pulsed Nd:YAG laser.

10. The method of claim 1, wherein the laser average power is at least 10 watts.

11. The method of claim 1, wherein the laser repetition rate is at least 100 per second.

12. The method of claim 1, wherein a laser spot size ranges from 0.1 mm to 10 mm diameter.

13. A method of removing a protective film from a substrate comprising:
   a. transmitting a laser light at a wavelength to transmit through a first film layer to a second film layer above the substrate and to be absorbed at an adhering interface between the first film layer and the second film layer wherein the first film layer and the second film layer comprise a first same material and the adhering interface comprises a second material different from the first material; and
   b. absorbing the laser light at the adhering interface between the first film layer and the second film layer, wherein as the laser light is absorbed at the interface, the first film and the second film are debonded.

14. The method of claim 13, wherein the first film layer and the second film layer comprise polyurethane.

15. The method of claim 13, wherein the first film layer remains intact as the first film and the second film are debonded.

16. The method of claim 13, wherein the protective film layers range ranges from 0.001 inches to 0.300 inches thickness.

17. The method of claim 13, wherein the laser wavelength is in the near infrared.

18. The method of claim 13, wherein the laser wavelength is 1064 nanometers.

19. A method of removing one or more protective films from a substrate comprising:
   a. transmitting a laser light at a wavelength to transmit through one or more than one transparent films and to be absorbed at an adhering interface between a last film above the substrate and a second to last film wherein the last film and the second to last film comprise a first same material and the adhering interface comprises a second material different from the first material; and
   b. absorbing the laser light at the adhering interface between the last film above the substrate and the second to last film,
   wherein as the laser light is absorbed at the interface, the last film and the second to the last film are debonded.

20. The method of claim 19, wherein the last film above the substrate and the second to last film comprise polyurethane.

21. The method of claim 19, wherein the second to last film remains intact as the last film and the second to the last film are debonded.

22. The method of claim 19, wherein the protective film ranges from 0.001 inches to 0.300 inches thickness.

23. The method of claim 19, wherein the laser wavelength is in the near infrared.

24. The method of claim 19, wherein the laser wavelength is 1064 nanometers.

25. A laser-based coating removal system to remove a protective surface coating from a surface, wherein the surface comprises a first material, the system comprising:
  a. a laser source configured to provide a laser pulse;
  b. a laser scanning head coupled to the laser source and configured to direct the laser pulse onto a position on the surface, wherein the laser pulse is configured with a wavelength such that the laser pulse passes through one or more transparent protective surface films and is absorbed at an underlying and separately applied bonding layer, wherein the underlying bonding layer adheres the protective surface film to the surface, and wherein the one or more transparent protective surface films comprise a second material different from the first material and the bonding layer comprises a third material different from the first material and the second material, and wherein as the laser light is absorbed at the bonding layer, the one or more transparent protective surface films are released.

26. The system of claim 25, wherein the laser scanning head is machine controlled.

27. The system of claim 25, wherein the laser scanning head is manually controlled such that a work head is moved by hand by over the surface.

28. The system of claim 25, wherein the protective film ranges from 0.001 inches to 0.300 inches thickness.

29. The system of claim 25, wherein the laser wavelength is in the near infrared.

30. The system of claim 25, wherein the laser wavelength is 1064 nanometers.

31. The system of claim 25, wherein the laser comprises a pulsed Nd:YAG laser.

32. The system of claim 25, wherein the laser average power is at least 10 watts.

33. The system of claim 25, wherein the laser repetition rate is at least 100 per second.

34. The system of claim 25, wherein a laser spot size ranges from 0.1 mm to 10 mm diameter.

* * * * *